H. N. BRAY.
VALVE.
APPLICATION FILED MAR. 23, 1911.

1,033,149.

Patented July 23, 1912.

Witnesses —

Inventor —
Horatio N. Bray.

UNITED STATES PATENT OFFICE.

HORATIO N. BRAY, OF MONTREAL, QUEBEC, CANADA.

VALVE.

1,033,149.   Specification of Letters Patent.   Patented July 23, 1912.

Application filed March 23, 1911. Serial No. 616,499.

*To all whom it may concern:*

Be it known that I, HORATIO N. BRAY, of the city of Montreal, Province of Quebec, and Dominion of Canada, have invented certain new and useful Improvements in Valves, of which the following is a full, clear, and exact description.

This invention relates to improvements in valves, and the object is to provide a valve which will not require any packing or attention to keep the same from leaking around the spindle.

A further object is to provide a valve operating device which may be attached to the body of any ordinary valve of corresponding size.

A still further object is to provide a valve having a spindle which does not reciprocate.

The device consists essentially of an internally threaded gland secured to the valve body. A plug is screwed into the gland and carries at the lower end thereof a loosely mounted valve. The upper portion of the plug is broached out square to coöperate with the square lower end of the valve spindle which slides therein. The valve spindle is shouldered to engage a seat on the stuffing nut which is screwed into the top of the gland. A spring is inserted in the plug to hold the spindle shoulder always against its seat.

Figure 2:
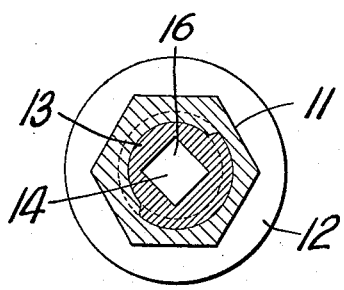
Figure 3:
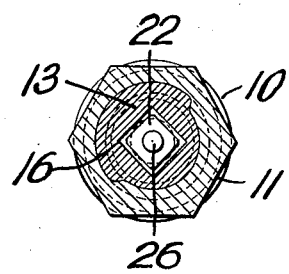
Figure 1:
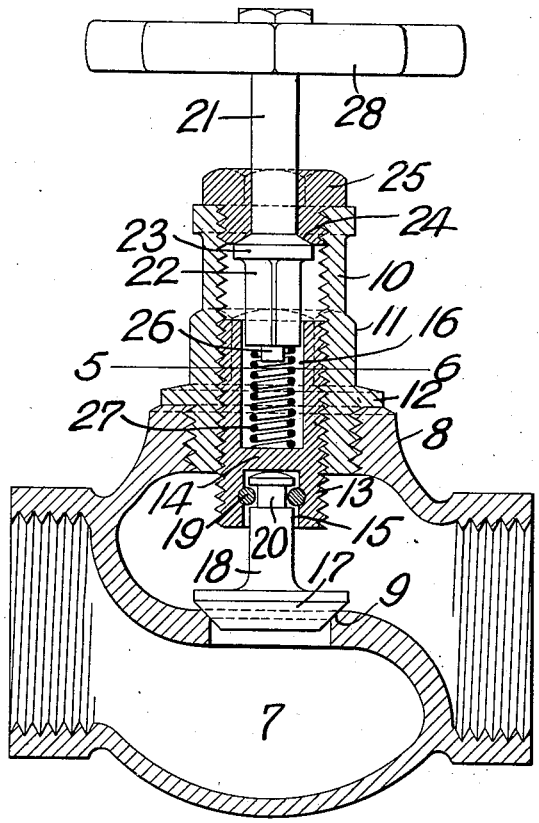

In the drawings which illustrate my invention:—Figure 1 is a vertical sectional view of the valve. Fig. 2 is a cross section on the line 5—6 of Fig. 1, looking downward. Fig. 3 is a similar cross section looking upward.

Referring to the parts, 7 designates a valve body of any ordinary design having an internally threaded neck 8, and valve seat 9. A gland 10 having the usual polygonal portion 11, to coöperate with a wrench, is screwed into the neck 8 until the gland flange 12 abuts the neck. The gland is internally threaded from top to bottom with a preferably continuous thread in order that the plug 13 may be screwed thereinto from either end. The plug 13 is hollow but is closed near the bottom by a diaphragm 14, the hollow portion 15 below the diaphragm being cylindrical, while the hollow portion 16 above the diaphragm is prismatic, preferably square. A valve 17, of suitable design, adapted to engage the seat 9, is provided with a short integral stem 18, which fits loosely into the recess 15, in the bottom of the plug. Any suitable means, such as the pins 19 in the plug engaging the groove 20 in the valve stem, may be used to connect the plug and valve.

The valve spindle 21 is provided with a polygonal lower portion 22, which is adapted to reciprocate freely in the recess 16 in the plug but cannot rotate therein. The lower portion 22 of the spindle is separated from the body thereof by a shoulder or collar 23 which is faced on the upper side to engage a seat 24 on the nut 25 which is screwed into the top of the gland 10. It will be readily understood that the nut 25 may be internally threaded and screwed over the outside of the gland if desired. A small post 26 may be formed on the lower end of the spindle to centralize the helical spring 27 which is located in the recess 16 of the plug and compressed between the lower end of the spindle and the plug diaphragm 14. A handle 28 fixed to the spindle completes the device.

The operation is simple and will be easily understood. When the spindle 21 is rotated, the polygonal portion 22 thereof which is unable to rotate within the plug 13 necessarily rotates the plug. The plug being screwed into the gland, rises or falls therein and thus opens or closes the valve, the plug sliding up around the polygonal portion 22 of the spindle. The spring 27, which is normally slightly compressed to hold the collar 23 against the seat 24, is still more compressed as the plug rises and thus forces the collar more tightly against its seat when the valve is opened. This pressure combined with the rotation of the spindle, will keep the collar 23 and seat 24 always ground to a perfect fit so that no leakage of water, steam or gas can occur at this point. The valve 17, being loosely attached to the plug, will always seat itself evenly all around without revolution, thus preventing the grinding in of any grit which might lodge on the valve or seat.

In some instances the valve 17 will be small enough to be drawn up through the gland on the removal of the nut and plug but in instances where the valve is too large for this, the gland will have to be removed. If, however, the pins 19 are omitted, the nut, spindle, and plug may be removed without displacing the valve or gland at all. If the pins 19 are omitted, the direction of flow through the valve will necessarily be left to right. It will be obvious that in many valves the gland and body may be formed integral.

Having thus described my invention, what I claim is:—

A valve comprising a body, a threaded plug operating therein having a polygonal recess in its upper end, a stuffing nut mounted on the body having a tapered seat, a spindle passing through said nut having within the body a tapered collar bearing on the seat of the nut and a polygonal portion engaging in the plug recess, a spring in compression between the end of said polygonal portion and the bottom of the recess, and a valve carried by the plug.

In witness whereof I have hereunto set my hand in the presence of two witnesses.

HORATIO N. BRAY.

Witnesses:
STUART R. W. ALLEN,
E. R. McKENZIE.

Copies of this patent may be obtained for five cents each, by addressing the "Commissioner of Patents. Washington, D. C."